United States Patent
Jansen et al.

(10) Patent No.: US 10,571,688 B2
(45) Date of Patent: Feb. 25, 2020

(54) METHOD AND DEVICE FOR PROTECTING A CAMERA FROM SOILING AND PRINTING INSTALLATION THEREWITH

(71) Applicant: Q.I. Press Controls Holding B.V., Oosterhout (NL)

(72) Inventors: Menno Jansen, Oosterhout (NL); Erik Andreas Van Holten, Teteringen (NL)

(73) Assignee: Q.I. Press Controls Holding B.V., Oosterhout (NL)

( * ) Notice: Subject to any disclaimer, the term of this patent is extended or adjusted under 35 U.S.C. 154(b) by 0 days.

(21) Appl. No.: 14/394,255

(22) PCT Filed: May 1, 2013

(86) PCT No.: PCT/NL2013/050326
§ 371 (c)(1),
(2) Date: Oct. 13, 2014

(87) PCT Pub. No.: WO2013/162372
PCT Pub. Date: Oct. 31, 2013

(65) Prior Publication Data
US 2015/0077539 A1    Mar. 19, 2015

(30) Foreign Application Priority Data
Apr. 27, 2012   (NL) ..................... 2008732

(51) Int. Cl.
*G02B 27/00*    (2006.01)
*B41F 13/42*    (2006.01)
(Continued)

(52) U.S. Cl.
CPC .......... *G02B 27/0006* (2013.01); *B41F 13/42* (2013.01); *B41F 33/0036* (2013.01); *G03B 11/043* (2013.01); *G03B 17/08* (2013.01)

(58) Field of Classification Search
CPC .. B41F 13/42; B41F 33/0036; G02B 27/0006; G03B 11/043; G03B 17/08
(Continued)

(56) References Cited

U.S. PATENT DOCUMENTS 4,450,456 A * 5/1984 Jekel .................... B41J 2/16508
                                             347/29
6,499,402 B1 * 12/2002 Sikes ...................... B41F 13/12
                                             101/171
(Continued)

FOREIGN PATENT DOCUMENTS

DE     202008014207 U1    1/2009
DE     102007042151 A1    3/2009
(Continued)

*Primary Examiner* — James T Boylan
(74) *Attorney, Agent, or Firm* — Rudy J. Ng; Bret E. Field; Bozicevic, Field & Francis LLP

(57) ABSTRACT

The invention relates to a method of protecting a camera (2) for inspecting printed work during printing from soiling. A transparent protective element (7) is placed here between the camera (2) and the printed work for inspection, and the protective element (7) is replaced when the transparency thereof decreases. The transparent protective element (7) can form part of a strip of transparent film (7) which is unwound from a supply reel (9) and wound onto a take-up reel (10). The decrease in transparency can be determined on the basis of a recording made by the camera (2). The invention also relates to a device (1) for protecting such a camera (2) from soiling, comprising a transparent protective element (7) to be placed between the camera (2) and the printed work for inspection; and means ( ) for replacing the protective element (7) when the transparency thereof decreases. The replacing means (8) can comprise a strip of transparent material (7) supplied on a supply reel (9) and be configured to unwind the film (7) from a supply reel (9) and wind it onto a take-up reel (10). The supply reel (9) and the take-up reel (Continued)

Figure 1:
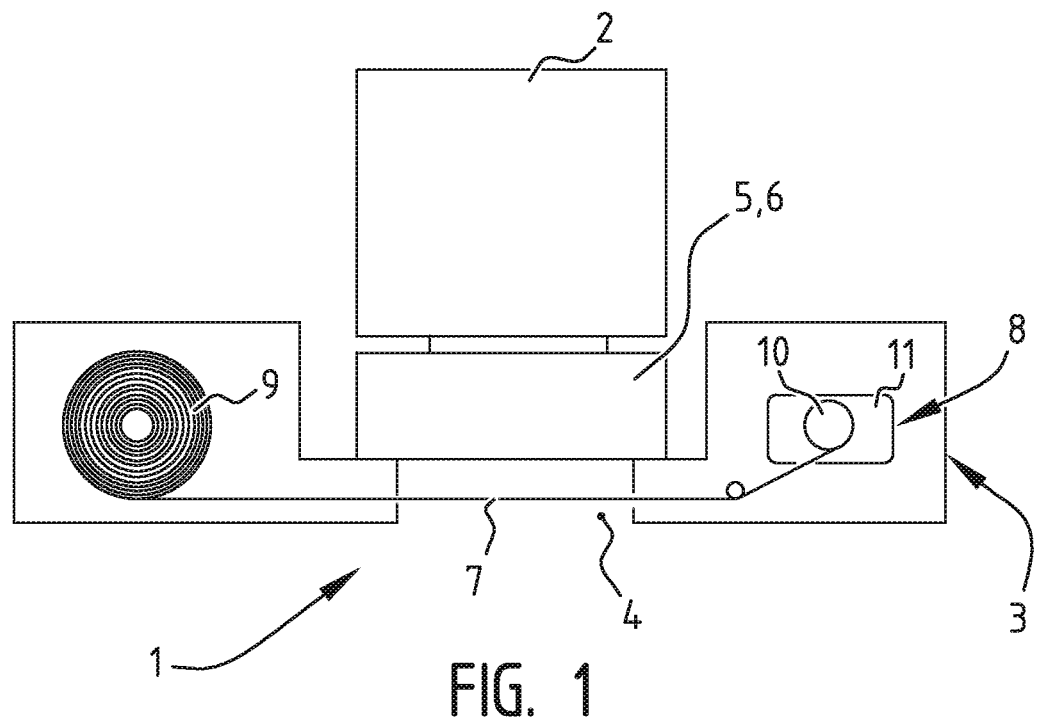

(10) can be received in a cassette (3) which has between the supply reel (9) and the take-up reel (10) an opening (4) along which the transparent film (7) is moved. Finally the invention further relates to a printing installation in which a camera (2) with such a protective device (1) is applied.

5 Claims, 2 Drawing Sheets

(51) Int. Cl.
  *G03B 17/08* (2006.01)
  *B41F 33/00* (2006.01)
  *G03B 11/04* (2006.01)

(58) Field of Classification Search
  USPC .............................................. 348/92; 359/507
  See application file for complete search history.

(56) References Cited

U.S. PATENT DOCUMENTS

| | | | |
|---|---|---|---|
| 2005/0025360 A1* | 2/2005 | Gin | G06K 9/00221 382/181 |
| 2006/0044323 A1* | 3/2006 | Ameline | G06T 11/001 345/595 |
| 2010/0101437 A1* | 4/2010 | Bauernfeind | B41F 13/42 101/171 |
| 2012/0140289 A1* | 6/2012 | Lachajewski | H04N 1/00015 358/3.01 |

FOREIGN PATENT DOCUMENTS

| | | | | |
|---|---|---|---|---|
| JP | 61-069019 A | | 4/1986 | |
| JP | 61-069019 | * | 9/1986 | ............. G02B 27/00 |
| JP | 6-178175 A | | 6/1994 | |
| JP | 6-202220 A | | 7/1994 | |
| JP | H 06202220 | * | 7/1994 | ........... G02B 27/006 |
| JP | H 07131688 | * | 5/1995 | |

* cited by examiner

METHOD AND DEVICE FOR PROTECTING A CAMERA FROM SOILING AND PRINTING INSTALLATION THEREWITH

The invention relates to a method for protecting a camera from soiling and to a device for performing this method.

In the graphic industry, particularly during production of printed work on rotary offset printing presses, cameras are used to measure quality. There are different cameras for different functions, such as colour register, cutting register, colour measurement and the like.

Because these cameras become soiled quite quickly by the printing production process, various solutions have been proposed to minimize the soiling and to enable quick cleaning of soiled cameras.

Methods thus exist for minimizing soiling by blowing air in front of the camera. There are also removable glass slides to enable quick and proper cleaning of the soiled cameras.

Some cameras even travel in a "dog house", where they are cleaned. This can for instance be done by means of a brush or by means of an air pulse.

Because there is no definitive solution to soiling and the cameras eventually become soiled anyway, maintenance will always be required. Maintenance costs are a problem, particularly for the processes where many cameras are used and few people remain involved in the production process.

The invention now has for its object to provide a method with which a camera can be protected from soiling. This is achieved according to the invention by placing a transparent protective element in front of the camera, in particular between the camera and the printed work for inspection, and replacing the protective element when the transparency thereof decreases.

Interposing of this protective element prevents soiling in effective manner, while regular replacement prevents the recording quality of the camera being adversely affected by the presence of the protective element.

The transparent protective element preferably forms part of a supply of transparent material and is replaced by placing another part of the supply of transparent material in front of the camera. The transparent material can thus be replaced without having to interrupt the operation of the camera.

The transparent material can here advantageously be moved along stepwise in front of the camera.

When the supply of transparent material comprises a strip of transparent film which is unwound from a supply reel and wound onto a take-up reel, replacement of the protective element can be performed in very simple manner. In order to enable undisturbed use being made of the camera, the supply reel can be exchanged here when the strip of transparent film has been substantially fully unwound.

This exchange can be realized quickly and easily when the supply reel and the take-up reel are received in a cassette and the supply reel is exchanged by changing the cassette.

Although the transparency of the protective element could be measured and monitored separately, it is simpler for the decrease in transparency to be determined on the basis of a recording made with the camera. A simple and reliable monitoring is achieved when the decrease in the transparency is determined on the basis of definition and/or colour of the recording.

The invention also relates to a device for protecting a camera from soiling, particularly a camera for inspecting printed work during printing. According to the invention such a device comprises a transparent protective element to be placed in front of the camera, in particular between the camera and the printed work for inspection, and means for replacing the protective element when the transparency thereof decreases.

Finally, the invention further relates to a printing installation in which a camera with such a protective device is applied.

Figure 2:
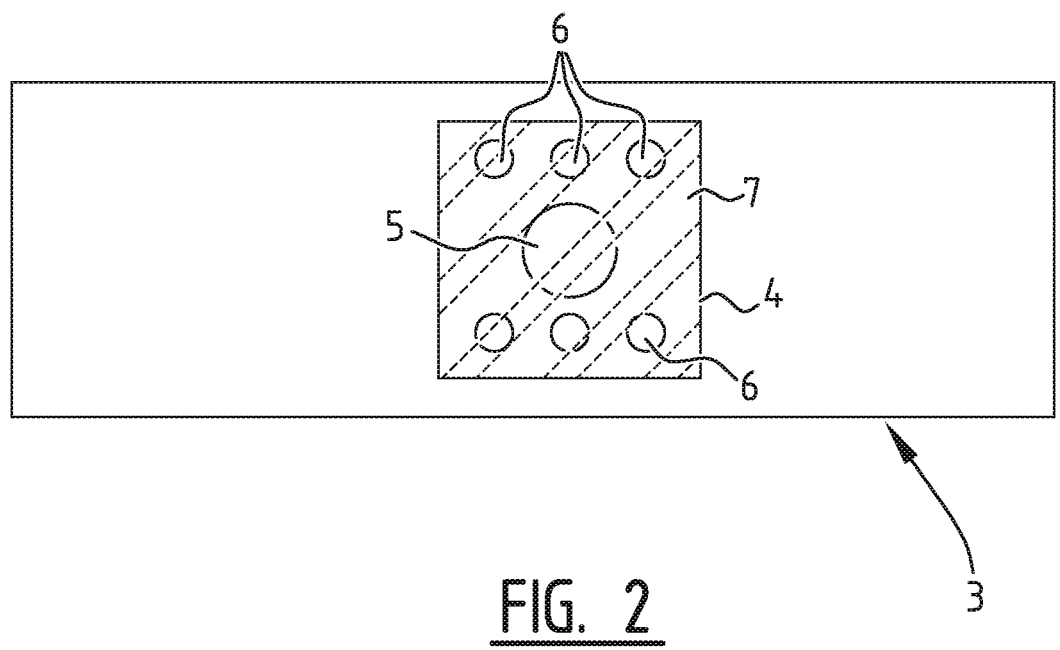
Figure 3:
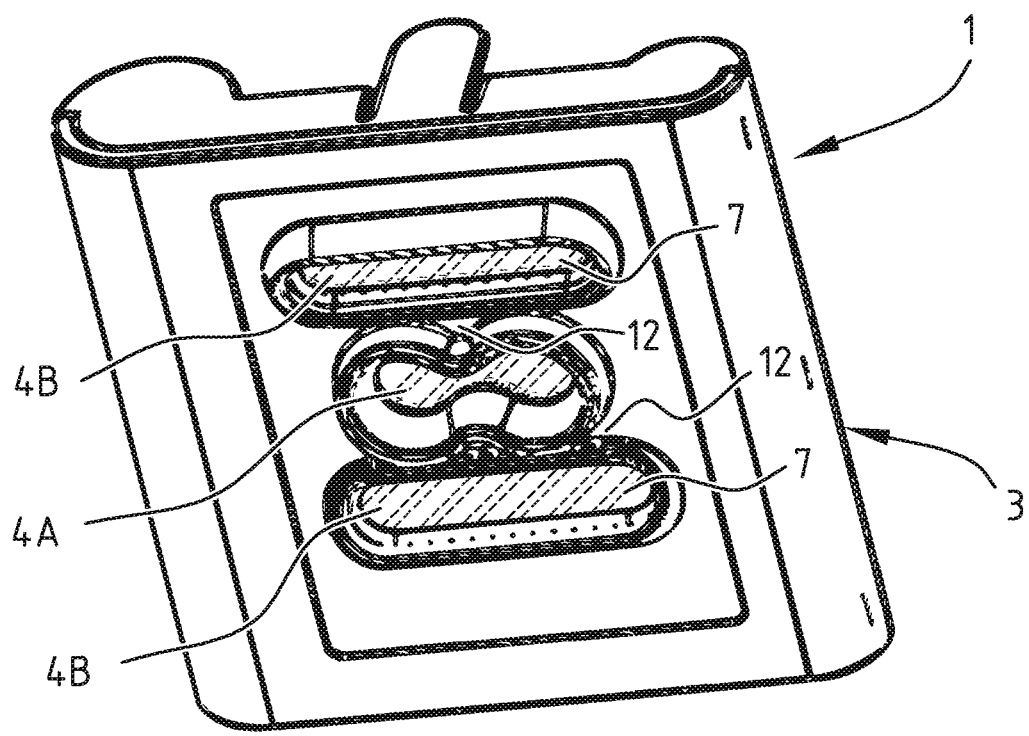
Figure 4:
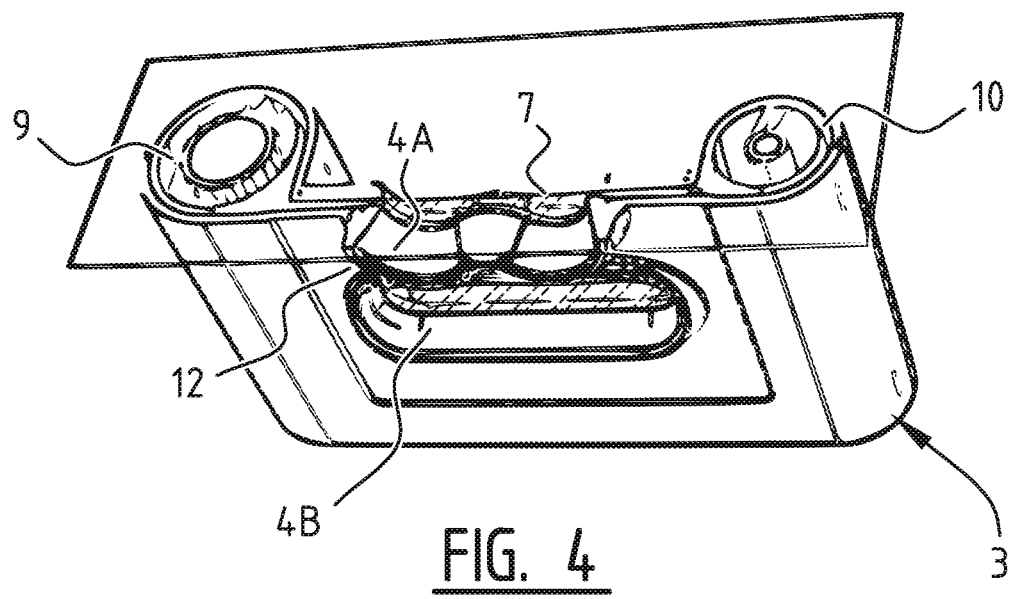

The invention is now elucidated on the basis of two embodiments, wherein reference is made to the accompanying drawing, in which:

FIG. 1 is a schematic top view of a camera with a device according to the invention, FIG. 2 is a schematic front view of the protective device of FIG. 1, FIG. 3 is a perspective view of a variant of the protective device, and FIG. 4 shows a cross-section through the protective device of FIG. 4.

A device 1 for protecting against soiling of a camera 2, particularly a camera for inspecting printed work during printing, comprises an exchangeable cassette 3 for placing between camera 2 and the printed work for inspection. Formed in cassette 3, which can be releasably connected to camera 2, is an opening 4 which lies in register with optical component 5 and lighting means 6 of camera 2. This opening 4 is closed off by a transparent protective element 7 which can be replaced when the transparency thereof decreases.

Protective device 1 is provided for this purpose with means 8 for replacing protective element 7. In the shown embodiment the replacing means 8 comprise a supply of transparent material, of which the transparent protective element 7 forms part. Replacing means 8 are configured to move the transparent material along stepwise in front of camera 2. The supply of transparent material is here a film wound onto a supply reel 9 and guided along opening 4 to a take-up reel 10. Replacing means 8 comprise a winding motor 11 connected to take-up reel 10 and controlled by means for detecting the transparency of the part of the film which is present in front of opening 4 and there forms the transparent protective element 7.

These detection means are incorporated in or co-act with camera 2, since in the shown embodiment the decrease in the transparency is determined on the basis of definition and/or colour of recordings made by camera 2. Each time it is determined that a recording has insufficient definition or is for instance too dark, camera 2 sends a signal to winding motor 11. This signal indicates that film 7 in front of the lens is soiled and is used to refresh the film in front of camera 2. The soiled film is wound onto take-up reel 10 in cassette 3.

Before supply reel 9 with clean film in cassette 3 is fully used up, a warning signal is sent that cassette 3 has to be exchanged. Cassette 3 is then removed and replaced by a new cassette. With normal use this need take place only several times a year.

In the embodiment of FIGS. 3 and 4 the single relatively large opening 4 in cassette 3 is replaced by a smaller central opening 4A, the shape of which is adapted to a double lens in camera 2, and two smaller elongate openings 4B for the lighting. Film 7 is thus also guided and supported in the centre by wall parts 12 of cassette 3 present between openings 4A, 4B. Deformation of the film 7, which could affect the quality of the recording, is hereby prevented.

Although the invention has been elucidated above on the basis of two embodiments, it will be apparent that it is not limited thereto. Other types of transparent protective element can also be envisaged, for instance plastic sheets or even thin glass plates. Other movements of the protective elements along the camera can also be envisaged, for instance a rotating movement in a plane in front of the camera.

The invention is therefore defined solely by the following claims.

The invention claimed is:

1. A device for protecting a camera from soiling, comprising:
    a transparent protective element to be placed in front of the camera; and
    a replacer configured to replace the protective element when the transparency thereof decreases, and
    a detector connected in controlling manner to the replacer and configured to detect the transparency of the transparent protective element,
    wherein the detector is configured to determine the transparency of the protective element on the basis of a recording made with the camera, the detector being configured to determine the transparency of the protective element on the basis of sharpness and color of the recording, and
    wherein:
    the replacer comprises a supply of transparent material of which the transparent protective element forms part, and the replacer is configured to place another part of the supply of transparent material in front of the camera when the transparency of the transparent protective element decreases,
    the supply of transparent material comprises a strip of transparent film supplied on a supply reel and the replacer is configured to unwind the film from the supply reel and wind it onto a take-up reel,
    the supply reel and the take-up reel are received in a cassette which has between the supply reel and the take-up reel at least one opening along which the transparent film is moved, the at least one opening lying in register with an optical component of the camera and with a lighting module of the camera,
    the cassette has at least two openings between the supply reel and the take-up reel, at least one of the openings lying in register with an optical component of the camera and at least another one of the openings lying in register with a lighting module of the camera, and
    the cassette comprises a wall between the at least two openings, the wall guiding and supporting the strip of transparent film to prevent deformation thereof.

2. The device as claimed in claim 1, wherein the replacer is configured to move the transparent material along stepwise in front of the camera.

3. The device as claimed in claim 1, wherein the replacer comprises a winding motor connected to the take-up reel.

4. The device as claimed in claim 1, wherein the cassette is connected releasably to the camera.

5. A printing installation, comprising at least one printing press, and at least one camera for monitoring printed work produced by the installation, the camera being provided with a device as claimed in claim 1.

* * * * *